United States Patent Office 3,471,453
Patented Oct. 7, 1969

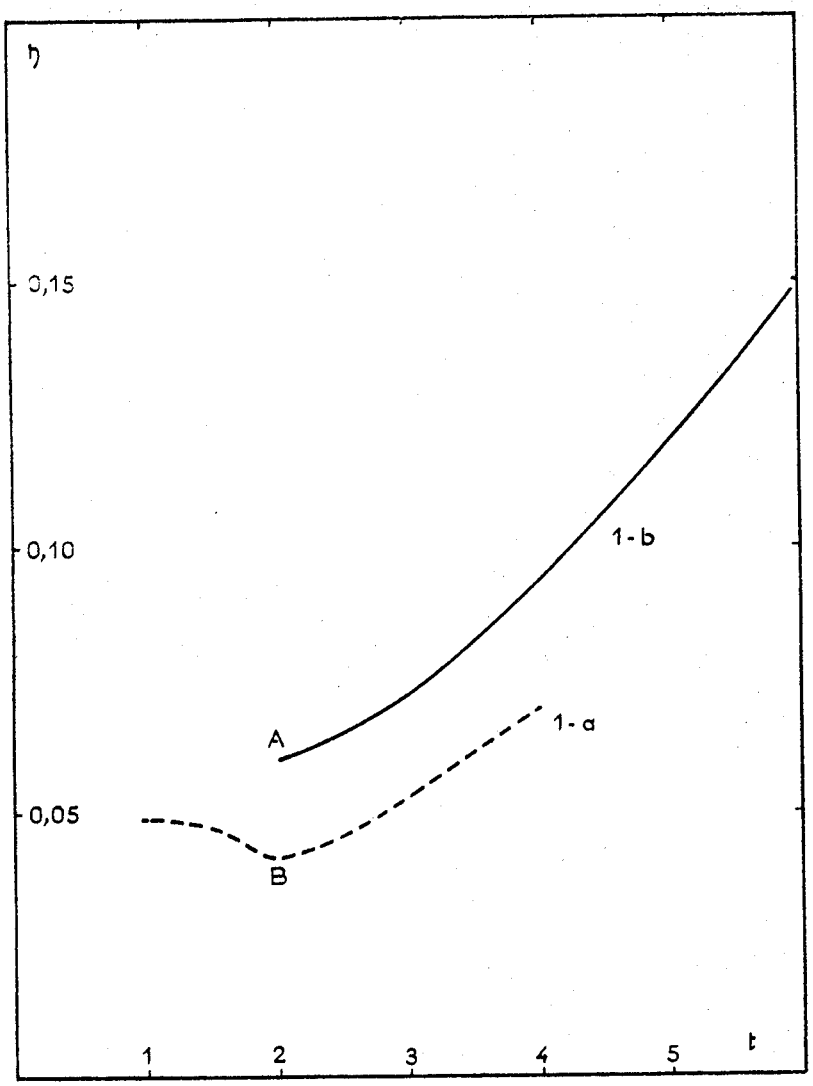

3,471,453
POLYBENZIMIDAZOLE-POLYAMIDE COPOLYMERS AND BLOCK POLYMERS
Guy Rabilloud, Bernard Sillion, and Gabriel de Gaudemaris, Grenoble, France, assignors to Institut Francais du Petrole, Malmaison, France
Filed Jan. 4, 1967, Ser. No. 607,268
Claims priority, application France, Jan. 17, 1966, 46,200
Int. Cl. C08g 20/20
U.S. Cl. 260—78                7 Claims

ABSTRACT OF THE DISCLOSURE

The present invention relates to new thermally stable nitrogen-containing resins containing either the group

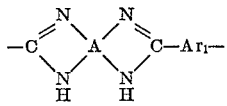

or the group

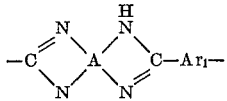

and the group

—CO—NH—Ar$_2$—Z$_1$—(Ar$_3$
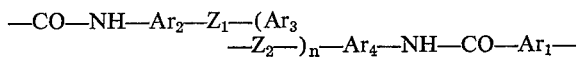—Z$_2$—)$_n$—Ar$_4$—NH—CO—Ar$_1$— wherein Z$_1$ and Z$_2$ are —CONH— or —NHCO— groups; Ar$_1$, Ar$_2$, Ar$_3$ and Ar$_4$ are divalent homocyclic, heterocyclic aromatic radicals, the two free valences of which are on different carbon atoms; and $n$ is zero or an integer, preferably 1; and A is a tetravalent homocyclic, heterocyclic aromatic radical, the four valences of which are on different carbon atoms forming 2 groups of ortho substitutions; and to the production of same by reacting a diester of an aromatic diacid having the formula ROOC—Ar$_1$—COOR, or a hemihalogenide-hemiester having the formula OOC—Ar$_1$—COX, with an aromatic diamine having the formula H$_2$N—Ar$_2$—Z$_1$—(Ar$_3$—Z$_2$—)$_n$—Ar$_4$—NH$_2$ and a tetra-amine having the formula

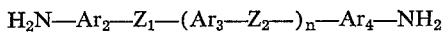
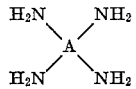

wherein R is a monovalent hydrocarbon radical containing 1–12 carbon atoms, Z is a halogen atom and the remaining radicals have the definitions given above.

---

This invention relates to thermally stable nitrogenous resins resulting from the reaction between a diester or a hemihalidehemiester of an aromatic diacid and a primary aromatic diamine and a primary aromatic tetra-amine, wherein the aromatic diamine has its aminogroups on distinct aromatic nuclei separated from each other by at least one carboxamide group.

These resins are characterized by the simultaneous presence in the polymeric chain of elementary groups M and P defined thereafter.

M means the group:

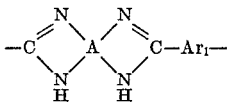

or the isomeric group:

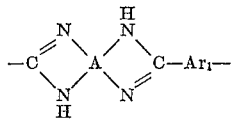

P means:

—CO—NH—Ar$_2$—Z$_1$—(—Ar$_3$—
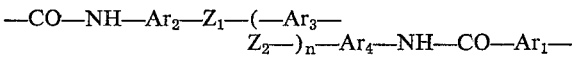Z$_2$—)$_n$—Ar$_4$—NH—CO—Ar$_1$— wherein Z$_1$ nd Z$_2$ are —CONH— or —NHCO— groups, Ar$_1$, Ar$_2$, Ar$_3$ and Ar$_4$ are divalent cyclic radicals which are homocyclic or heterocyclic and preferably aromatic, the two free valences of which are on distinct carbon atoms in any position with respect to one another; and $n$ is zero or a positive full number, preferably one.

These cycles preferably comprise 5 to 7 atoms selected from carbon, oxygen, sulfur and nitrogen, several cycles for example 2–4 per radical, being optionally condensed or connected. Each of the Ar radicals preferably contains 2–22 carbon atoms, 0–3 oxygen atoms, 0–3 sulfur atoms, 0–3 nitrogen atoms, and the amount of hydrogen necessary to satisfy the valences.

A is a tetravalent homocyclic or heterocyclic aromatic radical, the 4 valences of which are on distinct carbon atoms forming 2 groups of ortho substitutions.

A comprises preferably one or several, for example 1 to 4, cycles, each containing 5–7 atoms selected from carbon, oxygen, sulfur and nitrogen. Preferably A contains 4–22 carbon atoms, 0–3 oxygen atoms, 0–3 sulfur atoms, 0–3 nitrogen atoms, and the necessary amount of hydrogen to satisfy the valences.

When Ar and A comprise several interconnected cycles, the connection elements will be preferably the direct bond, or one of the following groups:

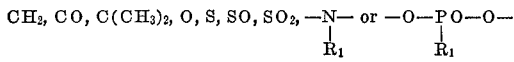

where R$_1$ is an alkyl or aryl radical preferably comprising 1–12 carbon atoms.

As examples of cycles which may be present in the Ar radicals, the following are to be named:

(a) Benzene, toluene, paraxylene, naphthalene, 1-methyl naphthalene, 1,5-diethyl naphthalene, phenanthrene, perylene, diphenyl, diphenylmethane, benzophenone, diphenylsulfide, diphenylsulfoxide, diphenylsulfone, diphenyloxide, pyrazine, pyridazine, pyridine, thiophene, furan, quinoline, phenoxazine, dibenzothiazine, phenazine, acridine, isoquinoline.

(b) 1,3,4-oxadiazole, 1,3,4-thiadiazole, 1,3-thiazole, 1,3-oxazole and pyrimidine.

As examples of cycles which may be present in the A radical those under (a) above may be named.

It results clearly that the polymers according to this invention contain at least 3 secondary amide groups —CONH— in the polymeric chain, per elementary unit or per N group.

On the other hand, this polymer will preferably contain 10–90% of groups M and 90–10%, i.e. the complement to 100%, of P groups.

A preferred process for manufacturing these resins consists of reacting a diester of an aromatic diacid, of the formula:

ROOC—Ar$_1$—COOR or a hemihalogenide-hemiester of the formula:

ROOC—Ar$_1$—COX with an aromatic diamine of the formula:

H$_2$N—Ar$_2$—Z$_1$—(—Ar$_3$—Z$_2$—)$_n$—Ar$_4$NH$_2$ and a tetra-amine of the formula:

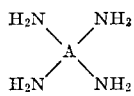

In these formulae, R is a monovalent hydrocarbon radical containing 1-12 carbon atoms, and preferably an aryl radical of 6-12 carbon atoms, more particularly the phenyl radical. Other less preferred radicals are methyl, ethyl, cyclohexyl and naphthyle. X is a halogen atom, preferably chlorine or bromine. Z, A, Ar and $n$ are as hereinbefore defined.

According to the choice of the reactant, being a hemihalogenide-hemiester or a diester, the stoichiometry and the way to process will be different. The condensation of the first of these reactants on the diamine takes 2 moles of hemihalogenide per mole of diamine according to:

$H_2N—Ar_2—Z_1—(Ar_3—Z_2—)_n—Ar_4—NH_2$
$+2ROOC—Ar_1—COX \rightarrow 2HX$
$+ROOC—Ar_1—CO—NH—Ar_2—Z_1—$
$(Ar_3—Z_2—)_n—Ar_4—NH—CO—Ar_1—COOR$ and the polycondensation of the latter compound on the tetraamine is carried out with substantially equimolecular amounts of reactants.

On the contrary, with a diester, there will be used a number of moles of amines (diamine plus tetraamine) which will be preferably the same as the number of moles of diester, or not very different therefrom.

For example, for 2 moles of diester, there will be used 0.2-1.8 moles of aromatic diamine and the complement of 2 moles of the tetra-amine.

The resins according to this invention are characterized by any chain of groups M and P such as defined above, according to the relative proportions of diamine and tetra-amine. By way of examples, the following chains may be mentioned:

—M—P—M—P—M—P— or

—M—M—P—P—M—P— when, for 2 moles of diester or hemihalogenide-hemiester, there is used one mole of diamine and one mole of tetra-amine.

For 3 moles of diamine and one mole of tetraamine with 2 moles of diester, the following chain will be realized:

—M—P—P—M—P—P— or

—M—P—P—M—P—P—P—P—

It is not possible to point out if the chain is regular or statistic.

Polymers of this invention distinguish over known aromatic polyamides by a better solubility in conventional solvents which favors their use, particularly for manufacturing fibers, films, or for the use as adhesive compounds for wood, metals, glass and the like, or as binders in the manufacture of laminates.

These polymers also exhibit advantages with respect to aromatic polybenzimidazoles:

Aromatic polybenzimidazoles of high molecular weight are characterized by a high stability at high temperatures, but they are made from rather costly chemical reactants, i.e. aromatic or heterocyclic tetra-amines, for example diaminobenzidine. If a part of the diaminobenzidine is replaced by an aromatic diamine, the price of the polymer is notably reduced, without decreasing the thermal stability of the polymer. Further, and this is quite unobvious, the mechanical properties are sometimes improved.

The manufacture of the polymer from a hemihalogenide-hemiester is carried out preferably by reacting this compound with the diamine, either in interfacial contact or in homogeneous solution. In the latter case, the solvent is a polar solvent which is able to dissolve the reaction product. As examples the following may be named: dimethylformamide, dimethylacetamide, N-methylpyrrolidone, hexamethylphosphoramide and the like.

The hydrogen halide liberated during the reaction is taken up by an agent such as triethylamine, pyridine or any other conventional base, or by the solvent itself.

The reaction product may be reacted with the aromatic tetra-amine in the solvent wherein it has been prepared. Alternatively it may be isolated by precipitation in a non-solvent such as water, alcohol, ether and the like, and it is then condensed with the tetraamine, after purification, either in the same solvent or in a different one.

If the reactant is an aromatic diester, the manufacture of the polymer is preferably carried out by reacting the aromatic amines in a predetermined order: at first the diamines, and thereafter the tetraamines. However the reactants may also be mixed up at the start of the reaction and satisfactory results are obtained.

It is possible to operate without or with an inert polar solvent, i.e. a solvent the molecules of which contain carbon, hydrogen, and at least one heteroatom such as O, S or N, said solvent being not able to react with the said reactants. High boiling point solvents are preferred, particularly dimethylsulfoxide or N-methylpyrrolidone. Other solvents may also be used, such as dimethylformamide, pyridine, hexamethylphosphoramide, metacresol, chlorophenol or dimethylacetamide.

The reaction temperature is preferably higher than 100° C., for example between 100 and 300° C. The reaction takes usually 1-48 hours.

If the resin is to be used for manufacturing laminates or as adhesive or binding agent for solid materials, it is advantageous to stop the reaction when the inherent viscosity of the resin is between 0.03 and 0.20, preferably between 0.05 and 0.10 (as determined at 30° C. and for a concentration of 0.5% by weight in dimethylsulfoxide) and its softening temperature lower than 400° C.

For the impregnation of solid materials, it is better to dissolve the resin, if not done before, into a polar organic solvent such as defined above, before admixing it with solid reinforcing materials.

The most convenient concentration of resin in the impregnating solution is usually between 5 and 70% by weight, preferably between 25 and 50%. After having evaporated the solvent, one applies in straight contact the impregnated elements in order to obtain a laminate which is then treated by heat at a temperature preferably higher than 300° C. and for example between 310 and 400° C., under a pressure which is sufficient to make the elements adhere strongly to one another.

This operation is usually carried out in 2 or 3 successive steps, at first at a moderate temperature with or without applied pressure, then at a higher temperature under strong pressure. After cooling, the laminate article is preferably subjected to a reheating under vacuum, for example for 24 hours at 250° C., 24 hours at 300° C., 24 hours at 350° C. and eventually for 8-10 hours at 400° C. Test samples of the article may be cut to check the mechanical properties of the material.

The following raw materials may be used by way of examples:

DIESTERS

All esters derived from aromatic homocyclic or heterocyclic dicarboxylic acids may be used, but more preferably the phenyl esters, for example the phenyl esters of o. phthalic acid, isophthalic acid, terephthalic acid, 2,5-pyridine dicarboxylic acid, 2,6-pyridine dicarboxylic acid, 3,5-pyridine dicarboxylic acid, 1,4-naphthalene dicarboxylic acid, 1,6-naphthalene dicarboxylic acid, 2,6-naphthalene dicarboxylic acid, 2,5-pyrazine dicarboxylic acid, 2,5-furan dicarboxylic acid, 2,6-quinoline dicarboxylic acid, 2,5-thiophene dicarboxylic acid, and the like.

It is also possible to use the esters of aromatic dicarboxylic acids, the two carboxyl groups of which are on distinct aromatic nuclei, these nuclei being interconnected through a carbon-carbon bond, an ether bond, a methylene group or any other equivalent connection group. For example there may be used the phenyl diesters of 4,4'-biphenyl dicarboxylic acid, 4,4'-diphenylether dicarboxylic acid, 4,4'-biphenylmethane dicarboxylic acid, and the like.

HEMIHALOGENIDES-HEMIESTERS

By way of examples of these compounds, the following may be named: the phenyl esters of the following acids—2-chloroformyl benzoic acid, 3-chloroformyl benzoic acid, 4-bromoformyl benzoic acid.

The monochloride-monophenyl ester of each of the following acids: 2,5-pyridine dicarboxylic acid, 2,6-pyridine dicarboxylic acid, 3,5-pyridine dicarboxylic acid, 1,4-naphthalene dicarboxylic acid, 1,6-naphthalene dicarboxylic acid, 2,6-naphthalene dicarboxylic acid, 2,5-pyrazine dicarboxylic acid, 2,5-furan dicarboxylic acid, 2,6-quinoline dicarboxylic acid and 2,5-thiophene dicarboxylic acid.

DIAMINES

By way of examples:

3,3'-diamino benzanilide, 3,4'-diamino benzanilide,
4,4'-diamino benzanilide, 4,3'-diamino benzanilide,
N,N'-bis(p. aminobenzoyl) metaphenylene diamine,
N,N'-bis(m. aminobenzoyl) paraphenylene diamine,
N,N'-bis(m. aminobenzoyl)-4,4'-diamino diphenylether,
N,N'-bis(m. aminobenzoyl)-4,4'-diamino diphenylmethane,
N,N'-bis(m. aminobenzoyl)-4,4'-diaminodiphenylsulfone,
N,N'-bis(p. aminophenoxy-4-benzoyl) metaphenylenediamine,
N,N'-bis(p. aminophenoxy-4-benzoyl paraphenylenediamine,
N,N'-bis(p. aminophenoxy-4-benzoyl)-4,4'-diamino diphenylether,
N,N'-bis(p. aminophenoxy-4-benzoyl)-4,4'-diamino diphenylmethane,
N,N'-bis(p. aminophenoxy-4-benzoyl)-3,5-diamino pyridine,
N,N'-bis(m. aminobenzoyl)-3,3'-diamino benzanilide,
N,N'-bis(p. aminobenzoyl)-3,3'-diamino benzanilide,
N,N'-bis(m. aminobenzoyl)-3,4'-diamino benzanilide,
N,N'-bis (m. aminobenzoyl)-4,3'-diamino benzanilide,
N,N'-bis(m. aminobenzoyl)-4,4'-diamino benzanilide,
N,N'-bis(p. aminophenoxy-4-benzoyl)-3,3'-diamino benzanilide,
N,N'-bis(3-aminophenyl) isophthalamide,
N,N'-bis(3'-amino-3-benzamidophenyl) isophthalamide.

TETRA-AMINES

The aromatic tetra-amino compounds are selected such as to contain two ortho-diamino reactive centers. These compounds may have these two centers on the same aromatic nucleus, being either monocyclic or polycyclic with several condensed cycles, as 1,2,3,4-tetraaminobenzene, 2,3,6,7-tetraaminonaphthalene or the like.

They may also have each ortho-diamino center on distinct cycles, the latter being connected through a direct bond, an ether bond, a methylene bond or any other connection group as hereinbefore defined. Among these compounds, the following may be named: 3,3'-diamino benzidine, 3,3',4,4'-tetraamino diphenylether, 3,3',4,4'-tetraaminodiphenylmethane, 3,3',4,4'-tetraamino diphenylsulfide, 3,3',4,4'-tetraamino diphenylsulfone and the like.

The compounds of each of these groups may be used alone or as mixtures therebetween.

The following non-limitative examples are given by way of illustration; in these examples, viscosities are given at 30° C. for solutions of 0.5% by weight concentration in dimethylsulfoxide.

EXAMPLE 1

Taking all cares with respect to oxidation, there is admixed in a flask of 50 ml., the following reactants:

phenyl isophthalate: 8.48 g. ($2.66.10^{-2}$ moles)
3,3'-diamino-benzanilide: 4.54 g. (0.02 mole)
antitoxidant of the genus polyphenyl: 0.05 g.

The flask is heated by means of a metallic bath at 260° C. for 4 hours. From time to time samples are collected to determine their inherent viscosity.

The viscosity variation is give by curve 1–$a$ of FIGURE 1. On this figure, the abscissae give the reaction times in hours and the ordinates give the inherent viscosity such as defined above.

The same reaction is carried out again except that the reaction time is only 2 hours (point B on FIGURE 1–$a$). The solid product is dissolved in 16 ml. of dimethylsulfoxide and there is added 1.42 g. ($0.66.10^{-2}$ mole) of 3,3'-diamino benzidine. This solution is heated by means of a metallic bath at 220° C. for 6 hours. Samples are taken from time to time to check the inherent viscosity of the resin. The viscosity variation is given by curve 1–$b$ of FIGURE 1. Point A of FIG. 1–$b$ corresponds to the beginning of the second step reaction after 2 hours of first step reaction.

The resin resulting from the second step is particularly convenient for manufacturing laminates when its inherent viscosity is between 0.06 and 0.10.

If the second step reaction is continued beyond the above given time, the resin precipitates out from the reaction mixture. Its polycondensation may be then carried out further by heating under vacuum for 30 min. at 250° CC., 1 hour at 300° C., 1 hour at 350° C. and 30 min. at 375° C. The resultant polymer is not soluble in conventional organic solvents.

EXAMPLE 2

There are intimately admixed under inert atmosphere 4.77 g. ($1.5.10^{-2}$ mole) of phenyl isophthalate with 1.135 g. ($0.5.10^{-2}$ mole) of 3,3' diamino benzanilide. The mixture is melted and brought to 250° C. for two hours.

The so-formed solid is dissolved in 10 ml. of dimethylsulfoxide 2.14 g. (0.01 mole) of 3,3' diamino benzidine are added thereto. The solution is maintained to reflux for 3 hours. After completion of the reaction, there is withdrawn a small quantity of the solution, the solvent of which is evaporated at 120° C. under a reduced pressure of 15 mm. Hg for 15 hours.

The prepolymer thus obtained has a melting point of 215° C. and an inherent viscosity of 0.075.

EXAMPLE 3

There is prepared a resin as according to the preceding example except that 4,3' diamino benzanilide is used as diamine. The reaction in molten state of the first stage is completed after 2 hours 15 minutes and thereafter the reaction is continued identically to that of Example 2. The prepolymer obtained has a melting point of 235° C. and an inherent viscosity of 0.083.

EXAMPLE 4

There is prepared, as in Example 2, a prepolymer with the following proportions of reactions:

phenyl isophthalate: 6.36 g. (0.02 mole)
3,3' diamino benzanilide: 2.27 g. (0.01 mole)
3,3' diamino benzidine: 2.14 g. (0.01 mole).

The prepolymer has a melting point of 225° C. and an inherent viscosity of 0.072.

EXAMPLE 5

There is prepared, as in Example 2, a prepolymer with the following proportions of reactions:

phenyl isophthalate: 4.24 g. (4/3.10$^{-2}$ mole)
3,3' diamino benzidine: 2.14 g. (0.01 mole).
3,3' diamino benzidine 0.71 g. (1/3.10$^{-2}$ mole)

The prepolymer has a melting point of 230° C. and an inherent viscosity of 0.069.

EXAMPLE 6

There is prepared a polymer with identical proportions of reactants as according to Example 5 except that the diamine is 4,3' diamino benzanilide. The product obtained with this reactant has a melting point of 240° C. and an inherent viscosity of 0.078.

EXAMPLE 7

There are admixed under inert atmosphere 8.48 g. (8/3.10$^{-2}$ moles) of phenyl isophthalate with 4.54 g. (0.02 mole) of 3,3' diamino benzanilide and 0.05 g. of an antioxidant.

This mixture is brought to 260° C. for 2 hr. 30 minutes and thereafter dissolved into 15 ml. of dimethylsulfoxide. To this solution are added 1.42 g. (2/3.10$^{-2}$ mole) of 3,3' diamino benzidine and the resulting mixture is brought to reflux of the solvent. A portion of the prepolymer is separated after various reflux times.

(7–a) After 1 hr. 30 min. of reflux:
The polymer has a melting point of 220° C. and an inherent viscosity of 0.060.

(7–b) After 2 hr. 30 min. of reflux:
The prepolymer has a melting point of 225° C. and an inherent viscosity of 0.066.

(7–c) After 3 hr. 30 min. of reflux:
The prepolymer has a melting point of 230° C. and an inherent viscosity of 0.073.

EXAMPLE 8

The following reactants are caused to react at 260° C. for 2 hours:

phenyl isophthalate: 3.18 g. (0.01 mole)
phenyl terephthalate: 1.06 g. (1/3.10$^{-2}$ mole)
3,3' diamino benzanilide: 2.27 g. (0.01 mole)
antioxidant: 0.06 g.

The reaction product is dissolved into 8 ml. of dimethylsulfoxide and 0.72 g. (1/3.10$^{-2}$ mole) of 3,3' diamino benzidine are added to the solution. After 2 hr. 45 min. of reflux, the prepolymer is separated from the reaction medium. It exhibits a melting point of 235° C. and an inherent viscosity of 0.068.

EXAMPLE 9

A prepolymer is prepared in the same manner as according to Example 4, with the following reactants:

4,4' diphenoxycarbonyl-diphenylether: 8.20 g. (0.02 mole)
3,3' diamino benzanilide: 2.27 g. (0.01 mole)
3,3' diamino benzidine: 2.14 g. (0.01 mole).

At the end of the reaction the prepolymer exhibits a melting point of 218° C. and an inherent viscosity of 0.079.

EXAMPLE 10

A prepolymer is prepared according to the process of Example 8, starting from the following reactants:

phenyl isophthalate: 6.36 g. (0.02 mole)
3,5 diphenoxy carbonyl-pyridine: 6.38 g. (0.02 mole)
3,3' diamino-benzanilide: 6.71 g. (0.03 mole)
3,3' diamino-benzidine: 2.14 g. (0.01 mole)

After 3 hours of reflux in dimethylsulfoxide the prepolymer has a melting point of 235° C. and an inherent viscosity of 0.067.

EXAMPLE 11

The following reactants are intimately admixed under inert atmosphere:

phenyl isophthalate: 12.72 g. (0.04 mole)
3,3' diaminobenzanilide: 2.27 g. (0.01 mole)
di-(3-aminophenyl) N,N' isophthalamide: 3.46 g. (0.01 mole)
antioxidant: 0.1 g.

The mixture is melted and immersed into a metal bath at 270° C. for 2 hours 30 min. The resulting product is then dissolved into 20 ml. of dimethylsulfoxide and 4.28 g. (0.02 mole) of 3,3' diamino benzidine are added to the solution. After 2 hours 45 min. of reflux the prepolymer exhibits a melting point of 238° C. and an inherent viscosity of 0.081.

EXAMPLE 12

There are intimately admixed, under inert atmosphere 12.72 g. (0.04 mole) of phenyl isophthalate and 5.84 g. (0.01 mole) of di-(3'-amino 3-benzamido phenyl)-N,N' isophthalamide. The mixture in a molten state is maintained for 2 hours at 265° C. and thereafter dissolved into 27 ml. of dimethylsulfoxide. To this solution are added 6.42 g. (0.03 mole) of 3,3' diamino benzidine. After 3 hours 15 minutes of reflux, the separated prepolymer exhibits the following characteristics: melting point of 230° C. and inherent viscosity of 0.09.

EXAMPLE 13

Example 11 is repeated but with the following reactants:

phenyl isophthalate: 12.72 g. (0.04 mole)
3,3' diamino benzanilide: 4.54 g. (0.02 mole)
di(3'-amino-4-benzamido phenyl) ether: 4.38 g. (0.01 mole)
3,3'diamino benzidine: 2.14 g. (0.01 mole).

The solvent used in the second stage is a mixture containing 75% by weight of dimethylsulfoxide and 25% by weight of methyl-N-pyrrolidone. The resulting prepolymer exhibits a melting point of 215° C. and an inherent viscosity of 0.069.

EXAMPLE 14

A prepolymer is prepared from the same reactants as those of Example 13 except that the di(3'-amino 4-benzamido phenyl) ether is replaced by 4.65 g. (0.01 mole) of bis(metaaminobenzamido-3,4'-benzanilide.

The resulting prepolymer has a melting point of 225° C. and exhibits an inherent viscosity of 0.076.

EXAMPLE 15

The solutions of prepolymers prepared in accordance with the preceding examples are used for impregnating a glass fabric.

The solvent is then evaporated under reduced pressure or into a gas stream at a temperature between 50 and 150° C. The impregnated fabric is cut into identical elements which are superposed so as to obtain a laminate material which is subjected to a heating treatment under a sufficient pressure to cause the respective elements to adhere to each other. The pressure conditions referred to in the table below are the following:

(A) The laminate is placed between the plates of a press, preheated to 135° C., with the plates in contact with the material without applying pressure, for 15 to 20 minutes. After that, a pressure of 14 to 15 kg./cm.$^2$ is applied and the temperature is increased up to 330–340° C. at a rate of 1.5° C. per minute. When this temperature level is reached the thermal treatment is continued under pressure for about 3 hours 30 minutes. At the end of this period the temperature is allowed to decrease to 120° C., the pressure of 15 kg./cm.$^2$ being however still maintained until the end of the treatment. The laminate is then removed from the press and cut into test-samples which are used to determine the mechanical characteristics of the composite material.

(B) The process is identical to that described in (A) but the plates of the press are initially preheated to 300° C.

(C) The process is identical to that described in (A) but the pressure applied is of 30 kg./cm.$^2$. After cooling, the laminates which are intended to be used at a high temperature are preferably subjected to a further thermal treatment under vacuum or in inert atmosphere, for instance for 24 hours at a temperature of 250° C., followed from 24 hours at 300° C., 24 hours at 325° C. and finally 24 hours at 350° C.

to reflux for 3 hours and then used for impregnating a glass fabric. The test-pieces, prepared in the same manner as according to the preceding example exhibit the following breaking-strains:

55–60 kg./mm.$^2$ at ambient temperature
46–50 kg./mm. at 300° C.
46–50 kg./mm.$^2$ in air after 50 hours at 250° C.

The above examples may be repeated successfully, using the above generally and specifically mentioned reactants. By way of examples, the following reactions may be carried out:

(A) 0.2 mole of 3,3'-bis (o.tolyloxycarbonyl) diphenylmethane are reacted with 0.12 mole of N,N'-bis

| Resin manufactured from prepolymer of example | Pressure conditions | Glass fabric | Maximal strain before breaking kg./mm.$^2$ | Temperature of the sample when breaking and for the preceding period where indicated |
|---|---|---|---|---|
| 2 | A | DET + | 54–58 | Ambient. |
| 3 | A | DET | 54–55 | Do. |
| 4 | A | {DET | 57–60 | Do. |
|   |   | {A-1 100 ++ | 70–71 | Do. |
|   |   |   | 65–66 | Do. |
|   |   |   | 50–54 | 250° C. for 30 min. |
| 5 | A | DET | 47–49 | 300° C. for 30 min. |
|   |   |   | 39–40 | 350° C. for 30 min. |
|   |   |   | 32–33 | 400° C. for 30 min. |
|   |   |   | 32–33 | 300° C. for 50 hr. |
|   |   | A-1 100 | 76–77 | Ambient. |
|   |   | Monodirectional | 125–130 | Do. |
| 6 | A | DET | 62–64 | Do. |
| 6 | C | {DET | 70–72 | Do. |
|   |   | {A-1 100 | 70–74 | Do. |
| 7-a | B | DET | 63–64 | Do. |
| 7-b | B | DET | 63–66 | Do. |
| 7-c | B | DET | 61 | Do. |
| 8 | B | DET | 60–64 | Do. |
| 9 | A | DET | 55–57 | Do. |
| 10 | A | DET | 54–55 | Do. |
| 11 | A | DET | 58–59 | Do. |
| 12 | A | DET | 56–58 | Do. |
| 13 | A | DET | 60–62 | Do. |
| 14 | A | DET | 43–46 | Do. |

+ DET means a glass fabric with double satin weaving without stiffening.
++ A 1 100 is the same fabric as DET but with a stiffening by γ-aminopropylsilane.

EXAMPLE 16

11.35 g. (0.05 mole) of 3,3' diamino benzanilide are dissolved into 100 ml. of anhydrous dimethylacetamide and 0.1 mole of triethylamine are added thereto. To the resulting solution, vigorously stirred at ambient temperature is added in a single operation a solution of 26.05 g. (0.1 mole) of phenyl 3-chloroformylbenzoate into 80 ml. of dimethylacetamide.

After stirring for 30 min., the mixture is filtered and the filtrate dropped in water. The product, which precipitates, is separated by filtration, washed and dried. There is obtained bis (3-phenoycarbonyl benzamido) 3,3' benzanilide with a yield of 85 to 90%.

Into a flask of 100 ml., provided with a top condenser and a nitrogen input, are introduced 13.52 g. (0.02 mole) of the previously prepared diester, 4.28 g. (0.28 mole) of 3,3'- diamino benzidine and 30 ml. of dimethylsulfoxide. The resulting solution is maintained to reflux for 3 hours 15 min. and used for impregnating a glass fabric. After evaporation of the solvent the pressing is conducted as according to paragraph (A) in example 15.

The so-obtained test-samples exhibit the following breaking-strains:

52–55 kg./mm.$^2$ at ambient temperature
42–45 kg./mm.$^2$ at 300° C.
53–55 kg./mm.$^2$ in air after 50 hours at 250° C.
27–30 kg./mm.$^2$ in air after 50 hours at 300° C.

EXAMPLE 17

Bis-(3-phenoxycarbonyl-benzamido) 4,3' benzanilide is prepared by reacting phenyl 3-chloroformylbenzoate with 4,4' diamino benzanilide as in the preceding example.

6.75 g. (0.01 mole) of this diester are caused to react with 2.14 g. (0.01 mole) of 3,3' diamino benzidine into 15 ml. of dimethylsulfoxide. The solution is maintained (m.aminobenzoyl)-4,4'-diaminodiphenylsulfone and 0.08 mole of 1,2,4,5-tetraaminobenzene.

(B) 0.2 mole of 2,4-xylyl 1,4-naphthalenedicarboxylate are reacted with 0.1 mole of N,N'-bis (p.aminobenzoyl) metaphenylenediamine and 0.1 mole of 2,3,6,7-tetraaminonaphthalene.

(C) 0.1 mole of m.tolyl 2,5-thiophenedicarboxylate are reacted with 0.05 mole 3,3'-diaminobenzanilide and 0.05 mole 3,3'-, 4,4'-tetraaminodiphenylsulfide.

What we claim is:

1. Thermally stable nitrogen-containing resins containing in their polymeric chain at least one group selected from the groups consisting of

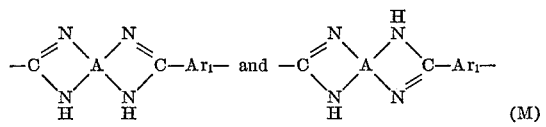

(M)

and at least one group having the formula

—CO—NH—Ar$_2$—Z$_1$—(Ar$_3$—Z$_2$—)$_n$—
Ar$_4$—NH—CO—Ar$_1$—   (P)

wherein Ar$_1$, Ar$_2$, Ar$_3$ and Ar$_4$ are divalent cyclic radicals selected from the group consisting of divalent homocyclic and heterocyclic aromatic radicals, the two free valences of which are on different carbon atoms, and in which the cycles comprise atoms selected from the group consisting of carbon, oxygen, sulfur and nitrogen; A is a tetravalent homocyclic or heterocyclic aromatic radical, the four valences of which are on different carbon atoms forming two groups of ortho substitutions; Z$_1$ and Z$_2$ are selected from the group consisting of —CONH— and —NHCO—, and n is 0 or 1.

2. Resins according to claim 1, characterized in that Ar$_1$, Ar$_2$, Ar$_3$ and Ar$_4$ each contain from 2 to 22 carbon atoms, from 0 to 3 oxygen atoms, from 0 to 3 sulfur atoms, from 0 to 3 nitrogen atoms and the hydrogen complement required to satisfy the valences, where $n$ is 0 or 1, and where A contains from 4 to 22 carbon atoms, from 0 to 3 oxygen atoms, from 0 to 3 sulfur atoms, from 0 to 3 nitrogen atoms and the hydrogen complement required to satisfy the valences.

3. Resins according to claim 2, characterized in that the polymeric chains of the resin contains from 10% to 90% of group M radicals and from 90% to 10% of group P radicals.

4. Process for manufacturing resins according to claim 1, characterized in that a compound selected from the group consisting of a diester having the formula ROOC—$Ar_1$—COOR and a hemihalogenidehemiester having the formula ROOC—$Ar_1$—COX is caused to react with an aromatic diamine having the formula $$N_2N-Ar_2-Z_1-(-Ar_3-Z_2-)_n-Ar_4-NH_2$$

and a tetraamine having the formula

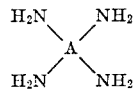

wherein R is a hydrocarbon monovalent radical containing 1-12 carbon atoms, X is a halogen atom and $Ar_1$, $Ar_2$, $Z_1$, $Ar_3$, $Ar_4$ and A are defined in claim 1.

5. Process according to claim 4, characterized in that each mol of diester is reacted with from 0.1 to 0.9 mol of diamine and 0.9 to 0.1 mol of tetraamine.

6. Process according to claim 4, characterized in that each two moles of hemihalogenide-hemiester is reacted with substantially one mol of diamine and substantially one mol of tetraamine.

7. Process according to claim 4, characterized in that the reaction is continued until the inherent viscosity of the resulting resin at a 0.5%, by weight, concentration in dimethylsulfoxide at 30° C. is between 0.03 and 0.20, and coating or impregnating a solid material with said resin and then heating said coated or impregnated solid material to a temperature of the order of 300–400° C. to complete the reaction of said resin.

References Cited
UNITED STATES PATENTS 3,174,947   3/1965   Marvel et al. _____ 260—47
3,354,125   11/1967  Smith et al. _____ 260—78

JOSEPH L. SCHOFER, Primary Examiner

C. A. HENDERSON, Jr., Assistant Examiner

U.S. Cl. X.R.

117—121, 122, 123, 127, 148, 161; 156—331; 161—170; 260—30.2, 30.8, 32.6, 33.4, 47, 63, 78.4